United States Patent [19]

Maruno et al.

[11] Patent Number: 4,712,930
[45] Date of Patent: Dec. 15, 1987

[54] GRADATION THERMAL PRINTHEAD AND GRADATION HEAT TRANSFER PRINTING APPARATUS

[75] Inventors: Susumu Maruno, Osaka; Shinobu Nakata, Takatsuki; Michinori Nagahiro, Katano; Seiko Minamide, Nara, all of Japan

[73] Assignee: Matsushita Electric Industrial Co., Ltd., Osaka, Japan

[21] Appl. No.: 903,886

[22] Filed: Sep. 4, 1986

Related U.S. Application Data

[63] Continuation of Ser. No. 729,039, Apr. 30, 1985, abandoned.

[30] Foreign Application Priority Data

Apr. 19, 1985 [JP] Japan .................... 60-83750

[51] Int. Cl.[4] ............ B41J 3/02; G01D 15/10
[52] U.S. Cl. ................ 400/120; 346/76 PH; 219/216
[58] Field of Search ........... 400/120; 346/76 PH; 219/216 PH

[56] References Cited

U.S. PATENT DOCUMENTS

| 4,300,142 | 11/1981 | Kos | 400/120 |
|---|---|---|---|
| 4,446,355 | 5/1984 | Sato et al. | 400/120 |
| 4,472,723 | 9/1984 | Shibata | 400/120 |
| 4,510,507 | 4/1985 | Ishikawa | 400/120 |
| 4,558,331 | 12/1985 | Adkisson | 219/216 PH |

FOREIGN PATENT DOCUMENTS

| 42885 | 3/1980 | Japan | 400/120 |
|---|---|---|---|
| 99681 | 8/1981 | Japan | 400/120 |
| 61584 | 4/1982 | Japan | 400/120 |
| 73973 | 4/1984 | Japan | 219/216 PH |
| 89183 | 5/1984 | Japan | 219/216 PH |
| 115871 | 7/1984 | Japan | 219/216 PH |
| 230774 | 12/1984 | Japan | 219/216 PH |
| 13568 | 1/1985 | Japan | 219/216 PH |
| 49965 | 3/1985 | Japan | 219/216 PH |

OTHER PUBLICATIONS

"Thermal Printhead", IBM Tech. Discl. Bull., vol. 22, No. 6, Nov. 1979, pp. 2436-2437.
"Low Power, High Quality, High Speed Piezoelectric/Thermal Printhead", IBM Tech. Discl. Bull., vol. 21, No. 8, Jan. 1979, pp. 3062-3064.

Primary Examiner—E. H. Eickholt
Attorney, Agent, or Firm—Stevens, Davis, Miller & Mosher

[57] ABSTRACT

A gradation thermal printhead having a plurality of heat generating elements each having a heat generating body connected between a pair of electrodes, the electric resistance value of the heat generating body being locally increased in one or more portions thereof. Disclosed also is a gradation heat transfer printing apparatus making use of the gradation thermal printhead mentioned above and employing an energy controlling means for varying the voltage or pulse width of the signal pulse voltage applied to the thermal printhead, thereby allowing a control of the area of the printed dot corresponding to one heat generating element, i.e., the density of printing, thus attaining a gradation control of the printed image.

4 Claims, 17 Drawing Figures

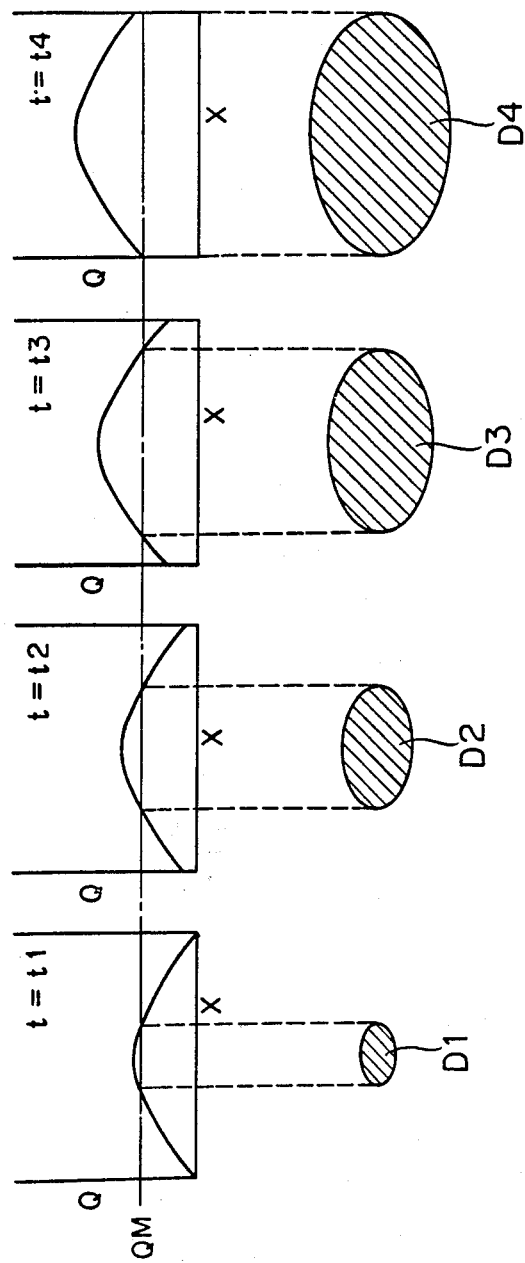

PULSE WIDTH SMALL ⟷ PULSE WIDTH LARGE

GRADATION THERMAL PRINTHEAD AND GRADATION HEAT TRANSFER PRINTING APPARATUS

This application is a continuation, of application Ser. No. 729,039, filed Apr. 30, 1985, now abandoned.

BACKGROUND OF THE INVENTION (1) Field of the Invention

The present invention relates to a thermal printhead and a thermal transfer printing apparatus.

(2) Description of the Prior Art

Hitherto, attempts have been made for effecting a gradation printing by thermal transfer printing method by making use of a thermal printhead. It is, however, extremely difficult to change the printing density of each dot formed by each heat generating element. Conventionally, therefore, the gradation control has been made in a false manner by using a plurality of dots in representing a single picture element. This method inconveniently complicates the signal processing and reduces the resolution of the printed image as compared with the density of arrangement of the heat generating elements on the recording head, thus impairing the fineness of the printed picture.

This problem of the prior art will be explained hereinunder with reference to the accompanying drawings.

FIG. 1 schematically shows the construction of a thermal transfer printer. The printer has a thermal printhead 1 having a plurality of heat generating elements 1R arranged in a direction perpendicular to the plane of the sheet of the Figure. A reference numeral 2 designates a thermal transfer ink sheet which is applied to the base film 2a by means of a heat-meltable ink 2b. As shown in the Figure, the thermal transfer ink sheet 2 and a printing paper 3 are adapted to run in the direction of an arrow, through the gap formed between the thermal printhead 1 and a platen 4. In order to ensure a close contact between the printing paper 3 and the thermal transfer ink sheet 2, as well as between the thermal transfer ink sheet 2 and the heat generating elements 1R of the thermal printhead 1, the platen is urged towards the thermal printhead 1.

FIG. 2 shows the detail of the array of the heat generating elements 1a on conventional thermal printhead 1. As will be seen from this Figure, each heat generating element 1R has a heat generating body 1b connected between a pair of electrodes 1a, 1a. In operation, voltages are applied selectively to the heat generating elements 1R in accordance wtih the recording signal, so that the selected heat generating elements 1R generate heat. As a result, the heat-meltable ink 2b on the portions of the thermal transfer ink sheet 2 adjacent the selected heat generating elements is molten and transferred, thus printing the data corresponding to the recording signal.

FIG. 3 shows the relationship between the amount of heat applied to the thermal transfer ink sheet 2 and the density D of the image formed on the printing paper 3.

As will be seen from FIG. 3, the printing density D exhibits an extremely large gradient when the heat amount Q ranges between $Q_1$ and $Q_2$, but the curve representing the density D is flat in the region between $Q_2$ and $Q_3$.

FIG. 4 shows the states of printing of dots on the printing paper 3 corresponding to the heat amounts $Q_1$, $Q_2$ and $Q_3$, respectively. The printing cannot be made satisfactorily when the amount of heat falls below $Q_2$, due to failure in the transfer of the heat-meltable ink 2b to the printing paper 3.

Then, as the amount of heat is increased to $Q_2$, the heat-meltable ink 2b in the whole area corresponding to the heat generating element 1R is molten and transferred to the printing paper 3, thus drastically increasing the printing density. However, when the heat amount is increased beyond $Q_2$ up to $Q_3$, the printing density is not increased appreciably and adjacent dots merge into each other undesirably.

Thus, the heat-meltable ink of the thermal transfer ink sheet 2 is not molten sufficiently and, hence, the transfer to the printing paper is not attained satisfactorily, unless the heat applied by the heat generating element exceeds a predetermined level. In other words, the transfer is made or not made depending on whether the heat input exceeds or not a predetermined threshold region which is between $Q_1$ and $Q_2$ in the case of the example shown in FIG. 3.

Therefore, it has been difficult to attain a smooth gradation control by linearly changing the heat amount applied to the thermal transfer ink sheet 2, when the printing is conducted on the thermal transfer ink sheet 2 by means of the conventional thermal printhead.

For this reason, when it is necessary to effect a gradation printing by using a thermal printhead having heat generating elements each consisting of a heat generating body 1b connected between a pair of electrodes 1a, 1a as shown in FIG. 2, it has been a common measure to use a matrix of a plurality of heat generating elements for representing each picture element and to change the number of dots, i.e., the heat generating elements, taking part in the heating operation in each matrix, thus attaining a gradation control by controlling the area occupied by dots as shown in FIG. 5.

More specifically, FIG. 5 exemplarily shows the case where each picture element is constituted by four dots, with each square representing the printing area for one dot.

When the gradation printing is conducted in accordance with the explained method by making use of the conventional thermal printhead shown in FIG. 2, the density of the picture elements, i.e., the resolution, is undesirably lowered as compared with the density of arrangement of the heat generating elements on the thermal printhead, so that the fineness of the print is impaired and a complicated procedure is required for processing the signals.

SUMMARY OF THE INVENTION

Accordingly, an object of the invention is to provide, by a comparatively simple way, a gradation thermal printhead and a thermal transfer gradation printing apparatus capable of making a sufficient gradation control and attaining a print image of a comparatively high resolution, thereby overcoming the above-described problems of the prior art.

To this end, according to one aspect of the invention, there is provided a thermal printhead having a plurality of heat generating elements each having a heat generating body disposed between a pair of electrodes, wherein the heat generating body is provided with one or more portions exhibiting high electric resistance.

According to another aspect of the invention, there is provided a thermal transfer gradation printing apparatus having the thermal printhead of the invention explained before and an energy control means for controlling the energy applied to the thermal printhead through controlling the voltages applied to the heat generating elements or the time durations of application of voltages to these heat generating elements. According to this arrangement, it is possible to freely change the area of the printing dot for each heat generating element, i.e., the printing density, so that the gradation control can be made by way of each dot, thus eliminating the necessity for the use of a plurality of dots for single picture element. Consequently, the printing can be made with a well controlled gradation and at a high resolution corresponding to the density of arrangement of the heat generating elements on the thermal printhead, thus allowing a high degree of fineness and gradation of the print.

BRIEF DESCRIPTION OF THE DRAWINGS

FIG. 9 is an illustration of the distribution of amount of heat generated by the heat generating element and the state of recording of each dot as observed when the time duration of application of voltage to the heat generating element shown in FIGS. 6A to 6C is varied;

DESCRIPTION OF THE PREFERRED EMBODIMENTS

Figure 6A:
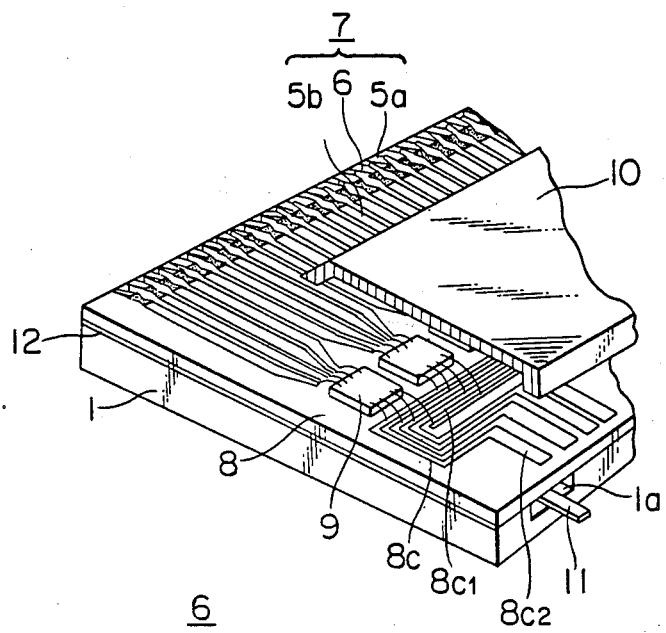
FIGS. 6A, 6B and 6C are illustrations of an embodiment of the gradation thermal printhead in accordance with the invention.

FIG. 6A shows a first embodiment of a gradation thermal printhead in accordance with the invention. This thermal printhead has a plurality of heat generating elements 7 arranged along a line, each heat generating element having a heat generating body 6 connected between a pair of electrodes 5a and 5b. The time duration of application of voltage to the gradation thermal printhead is controlled by an energy controlling means which is incorporated by a thermal transfer gradation printing apparatus provided in accordance with another aspect of the invention. A heat-meltable ink on the heat transfer ink sheet is transferred by the heat generated by the heat generating elements supplied with the voltage.

More specifically, in FIG. 6A, reference numeral 1 denotes a heat generating substrate, 8 denotes a base, 9 denotes a semiconductor element for driving the heat generating body, 10 denotes a semiconductor element protective cover and 11 denotes a lead wire.

According to the invention, a plurality of the heat generating bodies 6 are arranged in a row on the heat generating substrate 1. The heat generating bodies 6 are connected at their one ends to a common electrode 5a, while other ends are connected to independent picture signal electrodes 5b. As will be seen from FIG. 6B, the common electrode 5a continues to the reverse side of the heat generating substrate 1. Driving electrodes 8c for driving the semiconductor elements 9 for driving the heat generating bodies are formed on the same side of the heat generating bodies as the picture signal electrodes 5b. Each driving electrode 8c is composed of a pattern portion 8c1 which is wire-bonded to the semiconductor element 9 and a connecting terminal portion 8c2 for external connection. The picture signal electrode 5b is connected at its one end to the heat generating body 6 while the other end is wire-bonded to the semiconductor element 9. A heat generating element substrate 8 is bonded to the base 1 by means of a bond through the intermediary of an insulating layer of polyimide. The substrate 1 is provided with a notch 1a through which the lead wire 11 is extended externally. As will be seen from FIG. 6B, the lead wire 11 is fixed by soldering to the common electrode 5a spreading on the reverse side of the heat generating element substrate 8. The semiconductor protective cover 10 is secured at its both sides to the corresponding sides of the heat generating element substrate 8 by means of both-sided adhesive tapes so as to form a gap between itself and the heat generating element driving semiconductor element 9 thereby protecting the latter. In this case, the space between the semiconductor element 9 and the protective cover 10 is filled with a heat conductive compound agent so that the protective cover 10 is utilized as a heat radiation plate. The common electrode 5a is formed over one end face of the substrate 8 and spread over the reverse side of the substrate 8 so that it has a large width to reduce the wiring resistance to a negligibly small level.

Figure 6B:
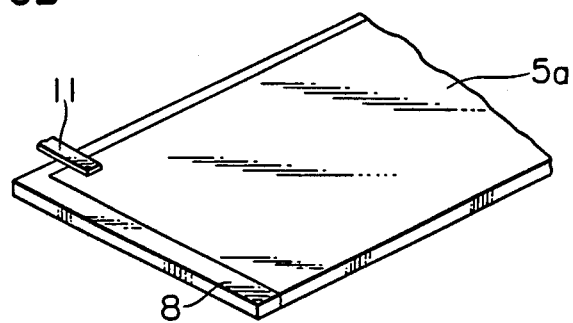
Figure 6C:
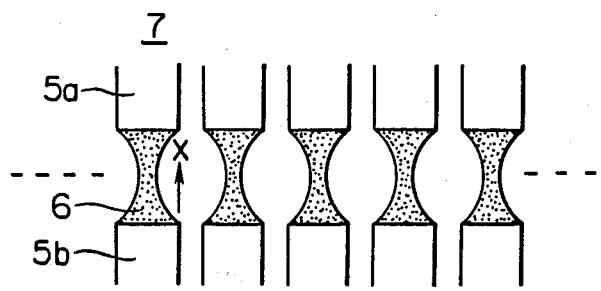
Figure 7:
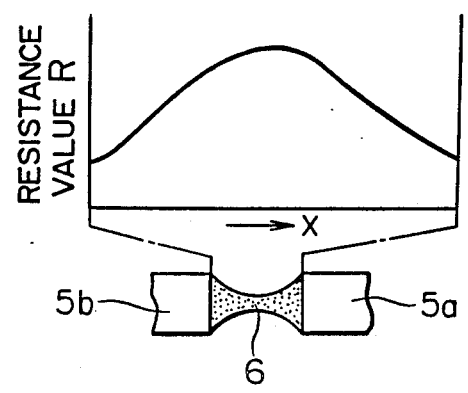
FIG. 7 is a characteristic diagram showing the distribution of resistance values along the length of each heat generating body incorporated in the thermal printhead shown in FIG. 6A.
Figure 8:
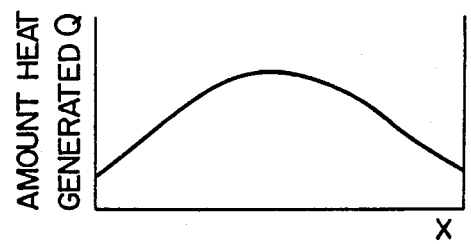
FIG. 8 is a characteristic diagram showing the distribution of resistance values along the length of the heat generating element shown in FIG. 6C.

FIG. 6C is an enlarged view of a part of the embodiment shown in FIG. 6B, showing in particular the portion around the heat generating bodies 6. As will be seen from this Figure, each heat generating body 6 has a width which is smallest at the central portion thereof and gradually increased towards the ends connected to respective electrodes 5a and 5b. Therefore, the heat-generating body exhibits such a distribution of resistance value R in the longitudinal direction X as having a peak value at the central portion and gradually decreases towards both ends connected to the electrodes 5a and 5b. FIG. 8 shows the distribution of the amount of heat Q generated in the heat generating body 6 in the direction of arrow X when a given voltage is applied between both electrodes 5a and 5b. It will be seen that the rate of generation of heat is greater at the central portion of the heat generating body 6 where the resistance value is greatest.

Figure 1:
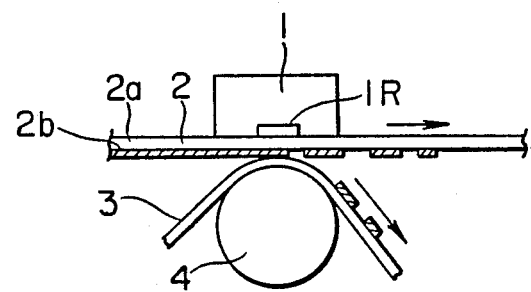
FIG. 1 is a schematic illustration of a conventional thermal transfer printer.
Figure 2:
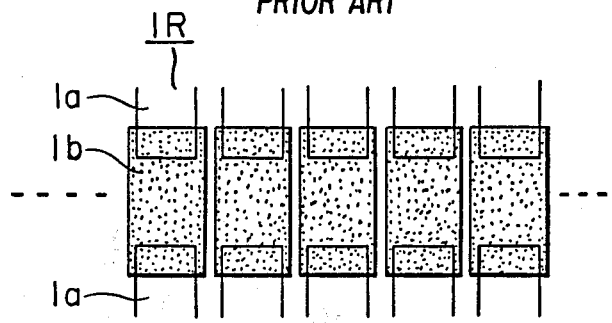
FIG. 2 is a plan view showing the construction of a conventional thermal printhead.
Figure 3:
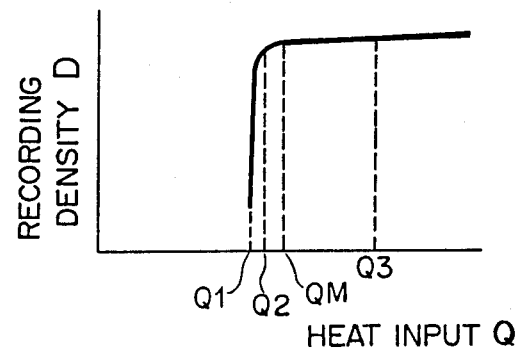
FIG. 3 is a chart showing the relationship between the amount of heat applied to the thermal transfer ink sheet and the printing density.
Figure 4:
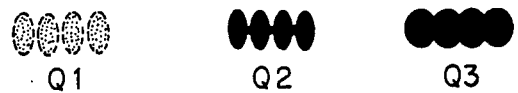
FIG. 4 is an illustration of the states of printing of dots on a printing paper, corresponding to heat input amounts $Q_1$, $Q_2$ and $Q_3$.
Figure 14:
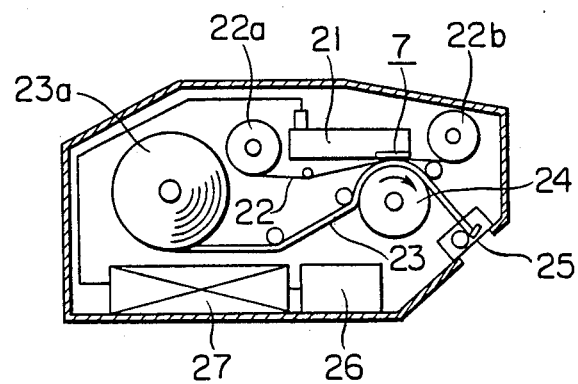
FIG. 14 is an illustration of a thermal transfer gradation printing apparatus in accordance with the invention.

FIG. 14 shows an example of the thermal transfer gradation printing apparatus in accordance with the invention. This printing apparatus incorporates a plurality of gradation thermal printheads of the first embodiment of the first aspect of the invention explained before in connection with FIG. 6A. A plurality of heat generating bodies 7 are arranged in the direction perpendicular to the plane of sheet of the drawing. The printing apparatus incorporates a thermal transfer ink sheet 22 which is equivalent to that of the conventional apparatus explained before in connection with FIG. 1. The thermal transfer ink sheet 2 is paid-off from a pay-off roll 22a and taken up by a take-up reel 22b. A reference numeral 23 designates an image receiving paper supplied from a roll 23a, while 24 denotes a platen which opposes the gradation thermal printhead 21 across the image receiving paper 23 and the heat transfer ink sheet 22. During the printing, the platen 24 is rotated in the direction of the arrow so that the printing is made successively on the image receiving paper which is successively fed from the roll 23a. The printing apparatus further has a rotary cutter 25 which is adapted to automatically cut the image receiving paper 23 ejected after the printing. The printing apparatus further has a power supply 26 for the gradation thermal printhead and an energy controlling means for controlling the width of the pulse of the voltage applied to the thermal printhead in accordance with the recording signal.

FIG. 9 shows the distribution of amount of heat Q generated in the heat generating element 7 shown in FIG. 6A in the direction X, as observed when a given voltage is applied between both electrodes 5a and 5b by the printing apparatus shown in FIG. 14, while varying the time duration of application of the voltage from t1 to t4 by the operation of the energy controlling means 27. FIG. 9 shows also the states D1 to D4 of printing of dots obtained on the printing paper corresponding to the distribution of the heat Q. In FIG. 9, the level QM of the heat Q represents the heat amount which is capable of melting the heat-meltable ink 22 and, hence, capable of transferring the ink to the recording paper 3. It will be seen that the ink is molten and, therefore, transferred to the printing paper, only at the portion of the thermal transfer ink sheet corresponding to the portion of each heat generating element 6 which produces the heat Q in excess of the level QM. Therefore, the dot diameter is increased as the time duration of application of the signal voltage is increased, as will be understood from the comparison of the dots D1 to D4 shown in FIG. 9. Needless to say, the greater dot diameter provides a higher printing density. According to the invention, it is thus possible to effect the area gradation by way of each dot, by controlling the time duration of application of the signal voltage.

From the foregoing description, it will be understood that the gradation thermal printhead and the gradation thermal transfer printing apparatus of the invention does not require the use of a plurality of dots for forming a signal picture element, so that the signal processing is conducted easily and the number of drivers for applying voltage to the heat generating elements can be reduced. In addition, a high resolution corresponding to the density of arrangement of the heat generating elements 7 on the gradation thermal printhead is obtained, as well as a fine control of the gradation.

Figure 5:
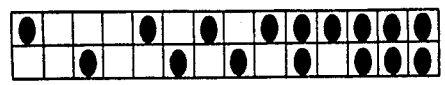
FIG. 5 is an illustration of an example of printing by a conventional method in which a single picture element is given by four dots so that the gradation of each picture element is controlled by way of area of the dots.
Figure 10:
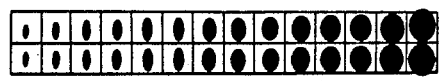
FIG. 10 is an example of a picture printed by the gradation printing conducted in accordance with a first embodiment of the invention.

FIG. 10 shows an example of an image formed by gradation printing conducted by a gradation thermal transfer printing apparatus of the second aspect of the invention employing the gradation thermal printhead in accordance with the first embodiment of the first aspect of the invention. It will be seen that the resolution and gradation are much improved so that the image quality is much better than the image shown in FIG. 5 produced by the conventional thermal printhead.

Figure 11:
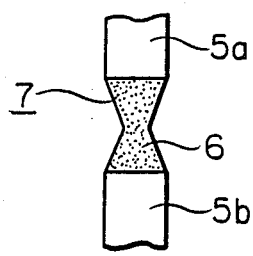
FIGS. 11, 12 and 13A are illustrations of other examples of heat-generating elements for use in the gradation thermal printhead in accordance with the invention.
Figure 12:
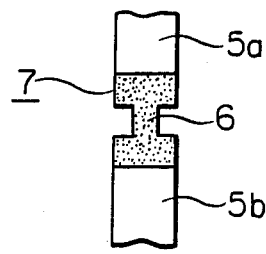

FIGS. 11 and 12 show other examples of the heat-generating element used in the gradation thermal printhead of the invention. It will be seen that these examples have forms of the heat generating body 6 between both electrodes 5a and 5b different from that shown in FIG. 6A, although these examples produce substantially equal effect as that produced by the arrangement shown in FIG. 6A. The examples shown in FIGS. 11 and 12 offer advantages in that the fabrication is facilitated and the cost is reduced by virture of the simple form of the heat generating bodies composed of straight lines.

Figure 13A:
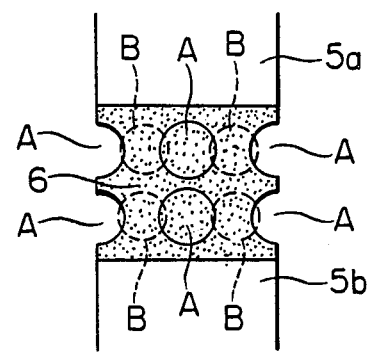
Figure 13B:
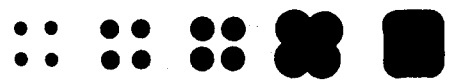
FIG. 13B is an illustration of the state of printing conducted by using the thermal printhead in accordance with the invention shown in FIG. 13A.

FIG. 13A shows a further example of the heat-generating element used in the gradation thermal printhead of the invention. In this case, the heat generating member 6 connected between the pair of electrodes 5a and 5b is provided at 6 (six) portions thereof with notches and apertures A so that four regions encircled by circles B exhibit greater resistance and, hence, a greater heat generation when the signal voltage is applied between the electrodes 5a and 5b. FIG. 13B shows the state of dot as obtained when the printing is conducted by the gradation heat transfer printing apparatus of the invention incorporating the gradation thermal printhead of the invention which employs the heat generating elements shown in FIG. 13A, while varying the width of the signal voltage pulse applied to the heat generating element. In this case, the dot formed by one heat generating element is constituted by four fine dot segments corresponding to the aforementioned regions B and the area of each dot segment is gradually increased as the pulse width is increased, thus attaining a gradation printing. This embodiment provides the best quality of the gradation printing among the embodiments of the thermal printhead of the invention.

The heat transfer ink sheet used in the described embodiments makes use of a heat-meltable ink as the material of the color layer. However, it will be clear to those skilled in that art that the invention can be equally applied to the case where a sublimation type dyes, which inherently permits a concentration gradation printing, are used as the color layer material. In such a case, a higher degree of gradation can be attained by the multiplication of the concentration gradation effect afforded inherently by the sublimation type dyes and the dot area gradation effect offered by the invention.

What is claimed is:

1. A gradation thermal printhead comprising a plurality of heat generating elements arranged in a line, each of said heat generating elements having a pair of electrodes and a heat generating body connected between said electrodes, said heat generating body having an electric resistance value distribution such that the resistance value is changed in a staggered manner at least in the direction of connection to said electrodes.

2. A gradation thermal printhead according to claim 1, wherein said staggered manner of variation in the electric resistance value is formed by at least one of notches and apertures formed in said heat generating body.

3. A gradation heat transfer printing apparatus comprising: a gradation thermal printhead having a plurality of heat generating elements arranged in a line, each of said heat generating elements having a pair of electrodes and a heat generating body connected between said electrodes, said heat generating body having an electric resistance value distribution such that the resistance value is varied in a staggered manner at least in the direction of connection to said electrodes; and an energy controlling means for controlling the energy applied to said thermal printhead; said apparatus employing a heat transfer ink sheet having a base film and a color material layer formed as a transfer medium on said base film; whereby the area of transfer of said color material layer corresponding to one heat generating element is varied through the control of the electric energy applied to said thermal printhead by said energy controlling means, thereby attaining a gradation printing of an image.

4. A gradation heat transfer printing apparatus according to claim 3, wherein said staggered manner of variation in the electric resistance value is formed by at least one of notches and apertures formed in said heat generating body.

* * * * *